United States Patent [19]

Frisch

[11] Patent Number: 4,774,681
[45] Date of Patent: Sep. 27, 1988

[54] METHOD AND APPARATUS FOR PROVIDING A HISTOGRAM

[75] Inventor: Arnold M. Frisch, Portland, Oreg.

[73] Assignee: Tektronix, Inc., Beaverton, Oreg.

[21] Appl. No.: 710,194

[22] Filed: Mar. 11, 1985

[51] Int. Cl.⁴ .......................... G06F 7/58; G06F 15/36
[52] U.S. Cl. ...................................... 364/554; 364/717
[58] Field of Search ....................... 364/554, 717, 200;
370/107; 382/51

[56] References Cited

U.S. PATENT DOCUMENTS

| | | | |
|---|---|---|---|
| 3,777,278 | 12/1973 | Majeau et al. ...................... | 364/717 |
| 4,047,008 | 9/1977 | Perkins ................................ | 364/717 |
| 4,161,041 | 7/1979 | Butler et al. ........................ | 364/717 |
| 4,511,961 | 4/1985 | Penton ................................. | 364/200 |
| 4,542,461 | 9/1985 | Eldridge et al. .................... | 364/424 |

FOREIGN PATENT DOCUMENTS

| | | | |
|---|---|---|---|
| 0625222 | 9/1978 | U.S.S.R. .............................. | 364/717 |
| 2064184A | 6/1981 | United Kingdom ................ | 364/717 |

OTHER PUBLICATIONS

Kerman: A Facility for Analyzing System Performance, IEEE Compcon 1979, pp. 79–82.
"Datamyte 400", published by Electro General Corporation of Minnetonka, Minn.

Primary Examiner—Felix D. Gruber
Attorney, Agent, or Firm—John P. Dellett; John Smith-Hill; Robert S. Hulse

[57] ABSTRACT

Information for a histogram is provided through generation of a pseudo-random sequence in a shift register connected in predetermined feedback relation. A histogram element storage location is addressed in a random access memory and is used for loading the shift register in parallel when an event corresponding to that element takes place. The shift register proceeds from that point to increment a pseudo-random sequence for the duration of the event, and the concluding value of the sequence is loaded back into the random access memory location at the conclusion of the event. A network between the random access memory and the shift register loads the shift register with a pattern that replicates the pattern that would exist in the shift register if the shift register had already been loaded and the data therein was shifted once.

14 Claims, 3 Drawing Sheets

| CLOCK PULSE | STATUS OF OUTPUT LINES | | | | | | | | | | |
|---|---|---|---|---|---|---|---|---|---|---|---|
| | $Q_0$ | $Q_1$ | $Q_2$ | $Q_3$ | $Q_4$ | $Q_5$ | $Q_6$ | $Q_7$ | $Q_2$ | $Q_7$ | $D_0$ |
| START | 0 | 0 | 0 | 0 | 0 | 0 | 0 | 1 | 0 | 1 | 1 |
| 1 | 1 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 |
| 3 | 0 | 0 | 1 | 0 | 0 | 0 | 0 | 0 | 1 | 0 | 1 |
| 4 | 1 | 0 | 0 | 1 | 0 | 0 | 0 | 0 | 0 | 0 | 0 |
| 5 | 0 | 1 | 0 | 0 | 1 | 0 | 0 | 0 | 0 | 0 | 0 |
| 6 | 0 | 0 | 1 | 0 | 0 | 1 | 0 | 0 | 1 | 0 | 1 |
| 7 | 1 | 0 | 0 | 1 | 0 | 0 | 1 | 0 | 0 | 0 | 0 |
| 8 | 0 | 1 | 0 | 0 | 1 | 0 | 0 | 1 | 0 | 1 | 1 |
| 9 | 1 | 0 | 1 | 0 | 0 | 1 | 0 | 0 | 1 | 0 | 1 |
| 10 | 1 | 1 | 0 | 1 | 0 | 0 | 1 | 0 | 0 | 0 | 0 |
| 11 | 0 | 1 | 1 | 0 | 1 | 0 | 0 | 1 | 1 | 1 | 0 |

FIG. 2

METHOD AND APPARATUS FOR PROVIDING A HISTOGRAM

BACKGROUND OF THE INVENTION

The present invention relates to a method and apparatus for providing information for a histogram and particularly to a method and apparatus for providing such information on a real time basis.

A histogram is a representation of the number and/or duration of certain events, for example portraying the times required by a computer to execute various procedures or instructions. An illustration of a histogram is provided in FIG. 3 wherein different events are represented by different horizontal bars and the lengths of the bars represent numbers of events or elapsed time.

A histogram may be generated by a computer via a software procedure employed on a sampling basis for logging the times required for different procedures or their number of occurrences, but unfortunately this approach has the effect of interfering with the software or computer being tested. A second approach would employ a plurality of hardware timers or counters, each assigned to a particular event or procedure, and each enabled when that particular event or procedure takes place. This approach is satisfactory for limited numbers of events but becomes impractical for a histogram of any size.

One prior art method is described in a paper by Steven Kerman, entitled: *A Facility for Analyzing Microprocessor System Performance*, published in the Digest of Papers, IEEE Compcon, 1979. In this system, a large number of counters is simulated by one counter and a random access memory. During the occurrence of each event the counter counts clock pulses and its concluding count is added to a stored value in memory. The same adder is employed successively for updating many different memory locations. While more practical than a multiplicity of counters, this system still tends to be somewhat hardware intensive and slower than desired because of the time required for adder operation. Lack of speed significantly limits the usefulness of a histogram processor in real-time applications.

SUMMARY OF THE INVENTION

In accordance with the present invention in a particular embodiment thereof, a method for providing information or data for a histogram stores a plurality of values representative of elements of a histogram, and, in response to the occurrence of an event of a type represented by a histogram element, generates a pseudo-random sequence of values. At the conclusion of the event, the stored representation for the said element is updated with the concluding number in the sequence. In particular, the sequence of values is started with a number theretofore stored for representing the element.

In an embodiment of the apparatus according to the present invention, a random access memory stores a plurality of values for representing elements of a histogram. Upon the occurrence of an event of a type portrayed by the histogram, a stored value is loaded into a pseudo-random sequence generator which proceeds to generate a sequence for the duration of the event. At the conclusion of the event, the value of the pseudo-random sequence is loaded back into the random access memory replacing the value initially representing the same element of the histogram.

In the foregoing manner the implementation of a multiplicity of counters is avoided and also the implementation of a separate counter and adder is avoided thereby decreasing the equipment cost and complexity while increasing operating speed.

It is accordingly an object of the present invention to provide an improved method and apparatus for providing information for a histogram wherein said data is rapidly generated.

It is another object of the present invention to provide an improved method and apparatus for supplying information for a histogram wherein the circuitry required is faster and less complex than prior art circuitry.

The subject matter of the present invention is particularly pointed out and distinctly claimed in the concluding portion of this specification. However, both the organization and method of operation of the present invention, together with further advantages and objects thereof, may best be understood by reference to the following description taken in connection with accompanying drawings wherein like reference characters refer to like elements.

DRAWINGS

FIG. 1 is a block diagram of apparatus according to the present invention for generating data for a histogram, FIG. 2 is a chart illustrating a pseudo-random sequence produced by the FIG. 1 apparatus, and FIG. 3 is an illustration of a typical histogram.

DETAILED DESCRIPTION

Figure 1:
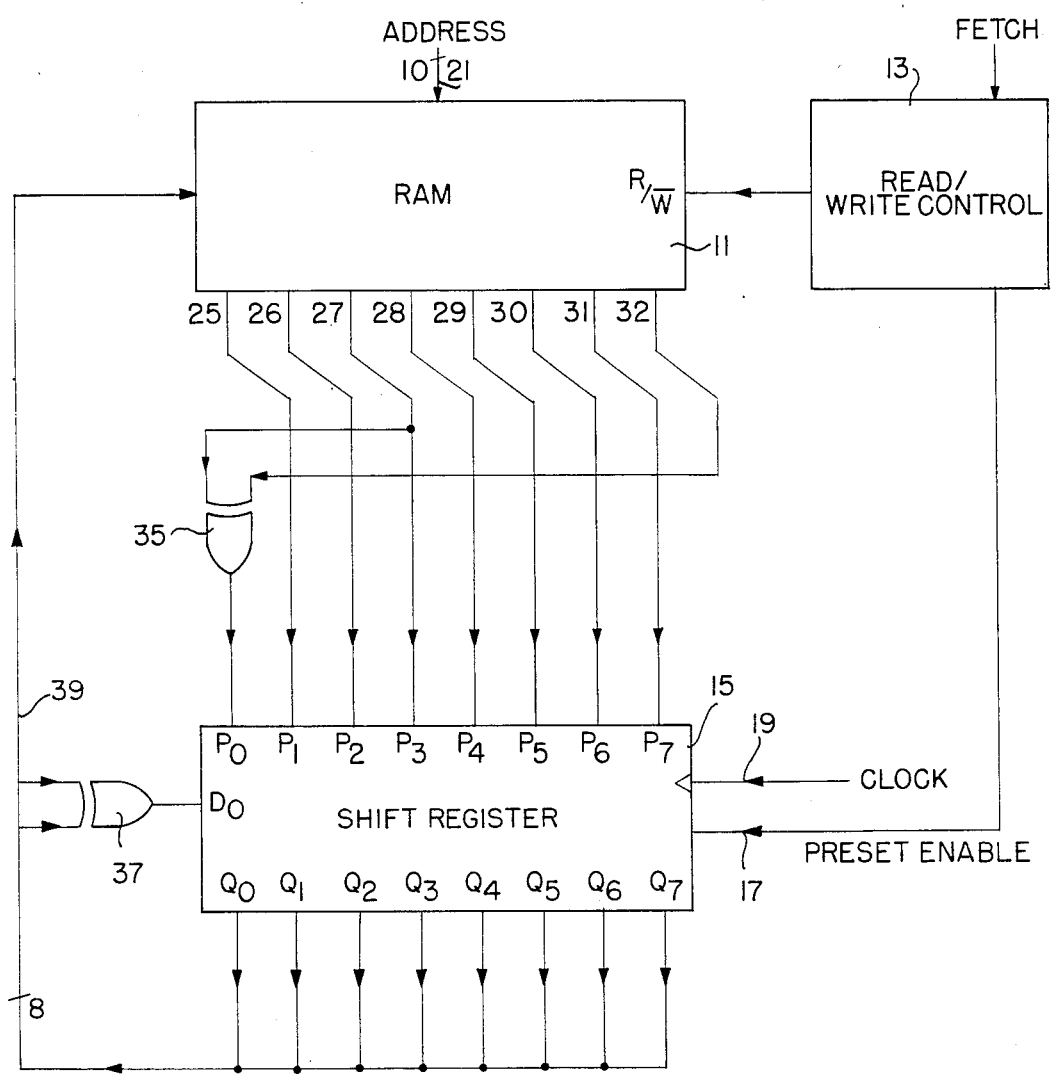
Figure 3:
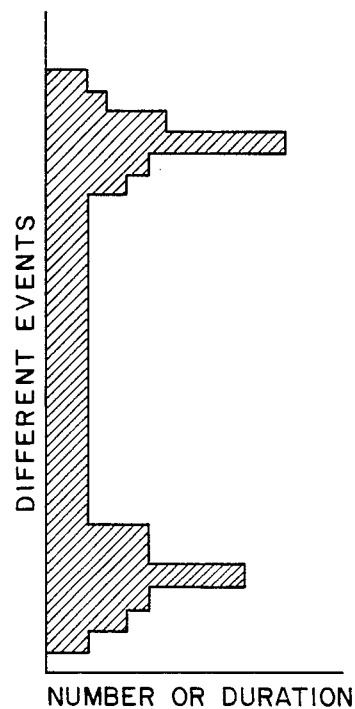

Referring to the drawings and particularly to FIG. 1, a random access memory 11 is employed to store histogram "counts" which represent the magnitude of histogram elements or levels, for example the lengths of the horizontal bars in the FIG. 3 histogram. It is understood that conventional graphic display equipment is utilized for displaying bars (or any other convenient kind of representation) in response to the numbers that are stored at various locations of memory 11.

In the present example, histogram generation will be described in connection with depicting the accumulated times required by a computer to implement certain procedures, i.e. wherein the histogram element represents all of the occurrences of an instruction or group of instructions and the total times spent in executing the same. This data is useful for detecting procedures for which excessive time may be required.

The data-out connections of random access memory 11 which are designated 25 through 32 are connected, via intervening circuitry, to parallel data inputs $P_0$ through $P_7$ of shift register 15. In particular, successive random access memory outputs 25 through 31 are connected to shift register parallel data inputs $P_1$ through $P_7$. Exclusive OR gate 35 receives inputs from data out leads 27 and 32 and supplies the $P_0$ parallel input of the shift register. The parallel data outputs of the shift register 15, designated $Q_0$ through $Q_7$, are returned as the data inputs for random access memory 11 through bus 39, while two shift register outputs, $Q_2$ and $Q_7$, supply the serial input $D_0$ of the shift register in feedback relation by way of exclusive OR gate 37.

Read/write control 13 operates random access memory 11 to bring about respective reads and writes at addresses specified on address bus 21 which may comprise an address bus of a computer. Actually, only predetermined higher order bits from bus 21 may be used to address memory 11 whereby each location in memory 11 identifies a series of computer instructions.

Read/write control 13 receives a fetch signal from the computer under test for initiating a read of the memory 11, and for also supplying a preset enable signal on line 17. This may be considered the occurrence of a given event. The preset enable signal enables the shift register to accept parallel data on inputs indicated at $P_0$ through $P_7$ from the memory when it is later clocked by a computer clock pulse on line 19. When not so enabled, the shift register functions in a conventional manner and shifts data received at serial input $D_0$ from left to right, as pulses are supplied by the computer clock.

The preset enable signal on line 17 disappears after one clock pulse, whereby subsequent clock pulses shift the parallel entered data. The data will continue to shift with each computer clock pulse so long as a particular portion of a program is being carried out, as represented by a given instruction (or series of instructions) having an address applied via bus 21.

The shift register 15 in the present embodiment receives serial input data from gate 37, comprising the exclusive ORed outputs $Q_2$ and $Q_7$ from the shift register. This serial input information is shifted one position to the right for each clock pulse, and this particular feedback configuration results in the generation by the shift register of a pseudo-random sequence of known length, here comprising $2^{17}$ unique combinations of parallel outputs $Q_0$ through $Q_7$. A portion of this sequence is illustrated in FIG. 2. Alternative feedback connections for supplying different pseudo-random sequences are clearly possible and the presently described configuration is given only by way of example. The sequence of unique outputs are treated as successive numbers for describing the accumulated magnitude of a given histogram element. Then when the fetch line of the computer goes false, the contents of the register are loaded back into the addressed random access memory location via lines 39 for "updating" the number theretofore stored at the same address.

By way of summary, it will be seen that upon occurrence of an event, e.g., upon instruction fetch for a particular address (or series of addresses) the shift register will receive as parallel input from the memory the end result of prior pseudo-random sequencing and will proceed in the same pseudo-random sequence so long as that address (or series of addresses) remains current. The addressed location in random access memory is then reloaded from shift register 15 to provide updating with the latest value for the histogram element.

As noted previously, the contents of random access memory 11 are not loaded directly into the parallel inputs of shift register 15, but are loaded via the intervening network including XOR gate 35. It will be seen the parallel loading of the shift register replicates the pattern that would exist if the output from the random access memory were already in the shift register and the shift register contents were then shifted to the right by one position. Thus, the clock pulse which causes the output of the memory to be loaded into the shift register, itself causes one shift in the sequence so that if the contents of the shift register are immediately written back into memory 11, the accumulation for the time period of one clock pulse is correctly made.

It is observed the accumulation and reloading of the memory by the shift register is accomplished without requiring an adder, and therefore the time required for carry propagation, etc. is avoided. The present system exhibits substantially increased speed of operation and can produce information for a display in real time generated from clocks having rates of twenty MHz and faster.

The generation of a histogram for depicting computer performances is given only by way of example, and histograms may be generated for a wide variety of purposes. For instance, the histogram bars in FIG. 3 may represent the incremental time periods occupied by a given voltage level of a waveform, e.g. a square wave or the like. The histogram can then be used to derive properties of the observed waveform such as average and RMS values, duty factor, etc. In these applications the use of a fast histogram processor allows results to be computed in significantly less time than would otherwise be possible.

It is common to digitize waveforms at frequencies in the 14 to 20 MHz range for video applications, and it has heretofore been difficult to design and construct histogram processing for keeping up, but these rates are easily achieved according to the present invention. Moreover, histogram processing is applicable to the accumulation of statistical data for use in complex real-time control systems. Two potential application areas are nuclear reactor control and controls for large electrostatic precipitators.

For histogram processing in a floating point context, two histogram processors of the type herein disclosed can be employed: one produces a modulo histogram, that is it accumulates the mantissa of a floating point histogram, and the second produces the characteristic or exponent of the floating point histogram by counting the modulo carries and accumulating their total at a memory address which corresponds to the memory address used for the mantissa. Typically the two processors are relatively loosely linked by a first-in-first-out buffer memory to allow the exponent processor to be constructed of slower, less costly hardware than the mantissa processor. The reason for employing a floating point histogram processor is to allow histograms of a greater depth to be processed while using fast hardware sufficient for a shallow histogram.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention described.

I claim:

1. A method of rapidly providing plural information elements suitable for a histogram portraying respective events by means of said elements, said method comprising:
   providing storage for a plurality of values representing said information elements,
   in substantially immediate response to the occurrence of a given event portrayable by a given element, automatically generating a predetermined non-incrementally changing sequence of values for the duration of said event,
   and automatically supplying a storage location for the given element with the value corresponding to said sequence substantially immediately at the conclusion of said event.

2. The method according to claim 1 wherein said sequence comprises a pseudo-random sequence.

3. The method according to claim 2 including generating said pseudo-random sequence by shifting data in a shift register, and feeding back contents of said shift register to a serial input thereof in predetermined logical combination.

4. The method according to claim 2 including starting said pseudo-random sequence with a value corresponding to a value theretofore stored for representing said given element.

5. The method according to claim 1 including storing said plurality of values in a random access memory, wherein different addressed locations in said memory store values corresponding to different elements.

6. A method of rapidly providing plural information elements suitable for a histogram portraying respective events by means of said elements, said method comprising:
  detecting a given event portrayable by a given element,
  generating a pseudo-random sequence of values in automatic response to said detection,
  and outputting said given element corresponding to a value of said pseudo-random sequence.

7. A method of rapidly providing information for a histogram, said method comprising:
  storing a value representing input increments at a given level as may characterize a histogram,
  generating a pseudo-random sequence in automatic response to occurrence of further input increments at said given level,
  and, in response thereto, storing a new value from said pseudo-random sequence.

8. The method according to claim 7 wherein said new value replaces the previously stored value.

9. The method according to claim 7 including starting said pseudo-random sequence with a value corresponding to the previously stored value.

10. A method of rapidly providing an information element suitable for a floating point histogram portraying respective events by means of respective elements, said method comprising:
  detecting a given event portrayable by a given element,
  and in automatic response thereto generating a pseudo-random sequence of values corresponding to the mantissa of said given element.

11. The method according to claim 10 further including generating a sequence of values corresponding to the characteristic of said given element in response to modulo carries of said mantissa.

12. Apparatus for providing information for a histogram, said apparatus comprising:
  a random access memory having a plurality of addressable locations,
  a shift register adapted to be loaded in parallel,
  means for loading data in parallel from a location in said memory into said shift register,
  means for causing the shifting of data in said shift register,
  and means for transferring the contents of said shift register back into said random access memory wherein said contents are employed as histogram information in place of data as originally loaded from said memory into said shift register,
  said shift register being interconnected in feedback relation to provide a predetermined number sequence as data is shifted therein, said sequence being representative of the number of times shifting has taken place.

13. The apparatus according to claim 12 wherein said means for loading data from a memory location into said shift register comprises logical means for replicating the pattern that would exist in said shift register if the data from said memory location were already in said shift register and incrementally shifted.

14. The apparatus according to claim 12 including gate means receiving parallel outputs of said shift register and providing a logical output coupled to a serial input of said shift register to supply feedback whereby said predetermined sequence is generated.

* * * * *